United States Patent
Sawada

(10) Patent No.: US 12,202,391 B2
(45) Date of Patent: Jan. 21, 2025

(54) SEAT WITH MOVEABLE SUPPORT MEMBER

(71) Applicant: SUBARU CORPORATION, Tokyo (JP)

(72) Inventor: Naomichi Sawada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 307 days.

(21) Appl. No.: 17/811,982

(22) Filed: Jul. 12, 2022

(65) Prior Publication Data

US 2023/0034577 A1    Feb. 2, 2023

(30) Foreign Application Priority Data

Jul. 30, 2021  (JP) ................. 2021-125585

(51) Int. Cl.
  *B60N 2/66*  (2006.01)
  *B60N 2/00*  (2006.01)
  *G01L 1/20*  (2006.01)
  *G06T 7/70*  (2017.01)

(52) U.S. Cl.
  CPC .......... *B60N 2/666* (2015.04); *B60N 2/0021* (2023.08); *B60N 2/003* (2023.08); *G01L 1/205* (2013.01); *G06T 7/70* (2017.01); *G06T 2207/30268* (2013.01)

(58) Field of Classification Search
None
See application file for complete search history.

(56) References Cited

U.S. PATENT DOCUMENTS

| 2009/0236883 | A1* | 9/2009 | Sugiyama | B60N 2/976 297/217.1 |
| 2010/0283299 | A1 | 11/2010 | Onuma et al. | |
| 2012/0049595 | A1 | 3/2012 | Inou et al. | |
| 2016/0297337 | A1* | 10/2016 | White | B60N 2/0273 |
| 2018/0118060 | A1* | 5/2018 | Zouzal | B60N 2/914 |
| 2018/0206646 | A1* | 7/2018 | Breibart | A47C 7/0213 |

(Continued)

FOREIGN PATENT DOCUMENTS

| JP | 2009-165588 A | 7/2009 |
| JP | 2012-045098 A | 3/2012 |

(Continued)

*Primary Examiner* — Amelia Vorce
(74) *Attorney, Agent, or Firm* — Smith, Gambrell & Russell, LLP

(57) ABSTRACT

A seat having a seat surface and a backrest includes a support member, a support-member driving unit, a specific-region position estimator, and a controller. The support member is provided in the backrest. The support member is configured to support a predetermined region of a body of a sitter to be seated on the seat and is movable in a vertical direction. The support-member driving unit is configured to drive the support member in the vertical direction relative to the backrest. The specific-region position estimator is configured to estimate a position of a specific region of the sitter that is defined in advance. The controller is configured to control the support-member driving unit such that the support member supports the specific region in accordance with the position of the specific region estimated by the specific-region position estimator.

14 Claims, 5 Drawing Sheets

(56) References Cited

U.S. PATENT DOCUMENTS

| | | | |
|---|---|---|---|
| 2020/0093279 A1* | 3/2020 | Lee | B60N 2/0244 |
| 2020/0383610 A1* | 12/2020 | Abe | A61B 5/4561 |
| 2022/0055510 A1* | 2/2022 | Mizoi | B60N 2/646 |
| 2022/0202201 A1* | 6/2022 | Zenzmaier | A47C 7/72 |
| 2022/0227274 A1* | 7/2022 | Yoshida | B60N 2/02246 |

FOREIGN PATENT DOCUMENTS

| | | | | |
|---|---|---|---|---|
| JP | 2016016059 A | * | 2/2016 | A47C 7/40 |
| JP | 2016-037107 A | | 3/2016 | |
| JP | 2017036048 A | * | 2/2017 | B60N 2/22 |

* cited by examiner

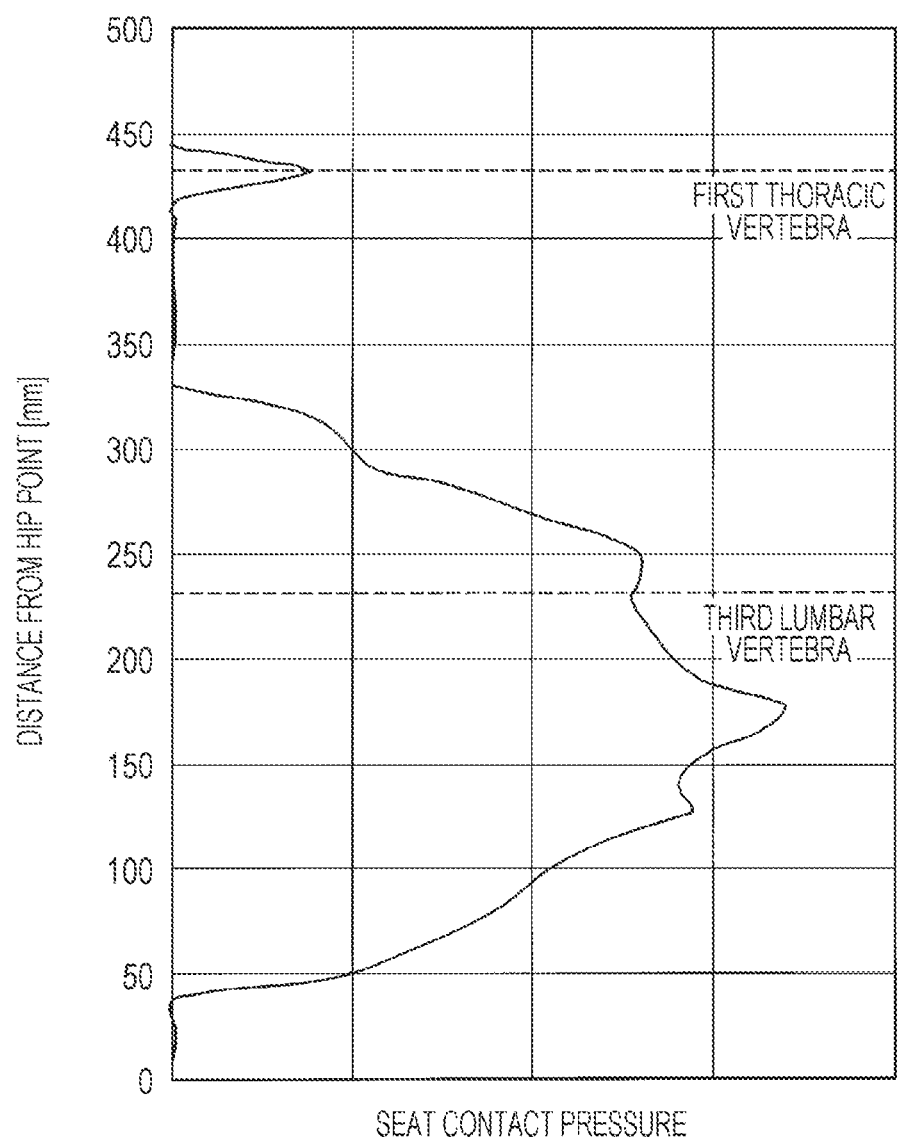

SEAT WITH MOVEABLE SUPPORT MEMBER

CROSS-REFERENCE TO RELATED APPLICATIONS

The present application claims priority from Japanese Patent Application No. 2021-125585 filed on Jul. 30, 2021, the entire contents of which are hereby incorporated by reference.

BACKGROUND

The disclosure relates to seats that are installed in, for example, vehicles and in which sitters sit.

A proposed example of a vehicular seat achieves improved functionality by reinforcing the support for a specific region (such as a specific rib) of a body of an occupant.

Japanese Unexamined Patent Application Publication (JP-A) No. 2012-45098 describes an example of seat-related technology for suppressing loss of posture in the left-right direction. In this technology, shoulder-blade aiding protrusions serving as a pair of left and right horizontal protrusions disposed on opposite sides of a center line of an upper-body support surface in the width direction are provided in a range that faces the fifth to seventh ribs, and rib-support inclined protrusions inclined along the inclination of the ribs are provided on the upper-body support surface so as to be in contact with an area between the ninth and tenth ribs. The upper side of the upper-body support surface relative to each protrusion is vertically movable relative to a seat surface.

JP-A No. 2009-165588 involves reducing loss of sitting posture over the entire body by detecting the load peak position of the pelvis in a seat cushion, detecting the position of the shoulder blades from a load distribution of the rib cage detected in a backrest, and moving the sitting area and the backrest in a direction for eliminating a deviation of each position from the initial position thereof.

JP-A No. 2016-37107 involves detecting, for example, the head position of an occupant and the contact position between the shoulder blades and a backrest by using an imaging device and a noncontact human sensor installed inside a vehicle, detecting, for example, the body pressure of the thighs by using a body-pressure sensor contained within a seat cushion, and determining the physique of the occupant.

SUMMARY

An aspect of the disclosure provides a seat having a seat surface and a backrest. The seat includes a support member, a support-member driving unit, a specific-region position estimator, and a controller. The support member is provided in the backrest. The support member is configured to support a predetermined region of a body of a sitter to be seated on the seat and is movable in a vertical direction. The support-member driving unit is configured to drive the support member in the vertical direction relative to the backrest. The specific-region position estimator is configured to estimate a position of a specific region of the sitter that is defined in advance. The controller is configured to control the support-member driving unit such that the support member supports the specific region in accordance with the position of the specific region estimated by the specific-region position estimator.

An aspect of the disclosure provides a seat having a seat surface and a backrest. The seat includes a support member, a support-member driving unit, and circuitry. The support member is provided in the backrest. The support member is configured to support a predetermined region of a body of a sitter to be seated on the seat and is movable in a vertical direction. The support-member driving unit is configured to drive the support member in the vertical direction relative to the backrest. The circuitry is configured to estimate a position of a specific region of the sitter that is defined in advance. The circuitry is configured to control the support-member driving unit such that the support member supports the specific region in accordance with the estimated position of the specific region.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

FIG. 5 illustrates an example of a detection result of a contact-pressure measuring unit in the seat according to the embodiment.

DETAILED DESCRIPTION

In order to facilitate various operations, such as a driving operation, and to enhance riding comfort, it is desirable to suppress roll behavior of the body of an occupant occurring due to force received from the road surface while a vehicle is traveling or due to lateral acceleration thereof.

It is known that loss of posture in the left-right direction can be suppressed by reinforcing the support for a specific rib, as in the technology described in JP-A No. 2012-45098. However, since the position (i.e., the height) of each rib varies from occupant to occupant, it is desirable that a rib support member be equipped with an adjustment mechanism to adapt to a wide physique range.

However, it is complicated for the occupant to adjust the rib support member, and if the occupant has poor skeletal-related knowledge, it is difficult to adjust the support member to a proper position for supporting the specific rib.

It is desirable to provide a seat that can easily achieve a favorable body-supported state in accordance with different physiques of sitters.

A seat according to an embodiment of the disclosure will be described below with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The seat according to the embodiment is used as, for example, a front seat (i.e., either of a driver seat and a passenger seat) of an automobile, such as a car.

Figure 1:
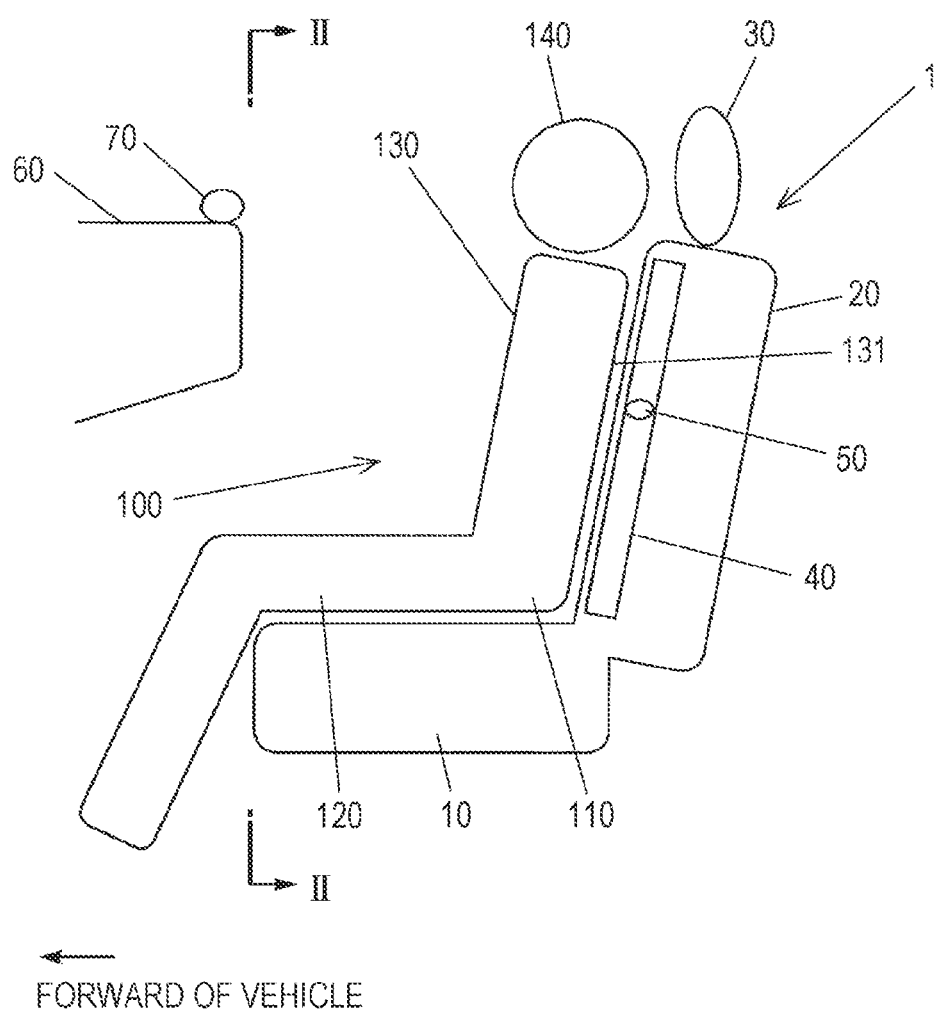
FIG. 1 is a side view schematically illustrating a seat according to an embodiment of the disclosure.

FIG. 1 is a side view schematically illustrating the seat according to the embodiment.

Figure 2:
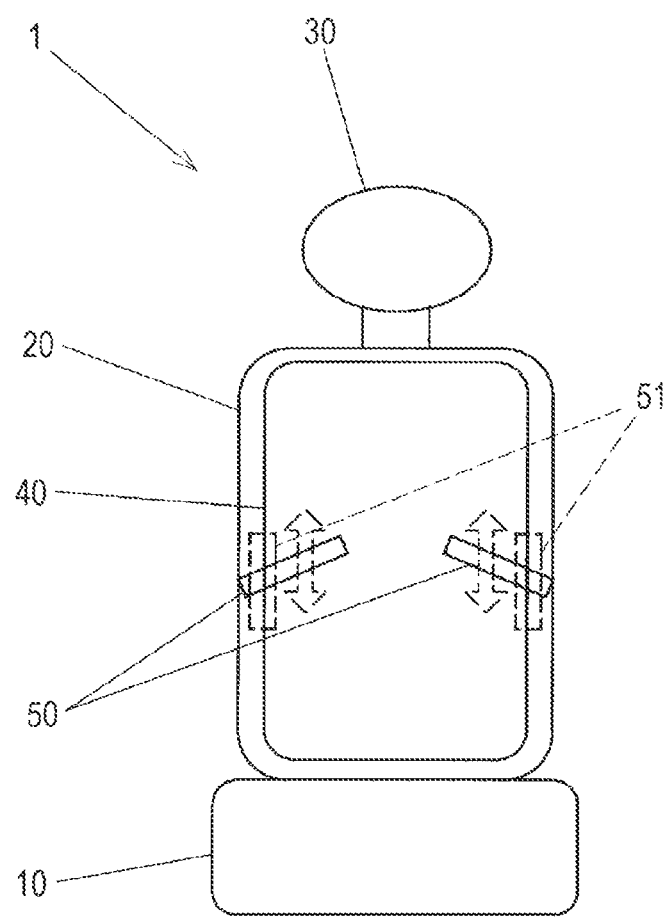
FIG. 2 is a diagram as viewed from an arrow II-II in FIG. 1.

FIG. 2 is a diagram as viewed from an arrow II-II in FIG. 1. In FIG. 2, a sitter is not illustrated.

A seat 1 according to the embodiment has, for example, a seat surface 10, a backrest 20, a headrest 30, a contact-pressure measuring unit 40, and a support member 50.

The seat surface 10 supports a hip 110 and thighs 120 of an occupant 100. In one embodiment, the occupant 100 may be referred to as a "sitter".

The backrest 20 is disposed along a back 131 of an upper body 130 of the occupant 100.

The backrest 20 extends upward from near the rear edge of the seat surface 10.

The headrest 30 protrudes upward from the upper edge of the backrest 20 and supports the rear of a head 140 of the occupant 100.

The contact-pressure measuring unit 40 is provided in a surface of the backrest 20 that is to come into contact with the back 131 of the occupant 100, and is configured to measure a distribution of contact pressure (i.e., body pressure) that the backrest 20 is to receive from the back 131.

For example, the contact-pressure measuring unit 40 may be constituted by arranging pressure-sensitive elements in a matrix in the planar direction of a film-like sensor sheet. The pressure-sensitive elements may be a pair of pressure-sensitive conductive ink electrodes whose resistance value changes in accordance with received pressure.

The support member 50 supports, for example, a lower area of the ninth rib serving. In one embodiment, the lower area of the ninth rib may be referred to as a "specific region" of the body of the occupant 100.

The support member 50 is provided along the surface of the backrest 20 facing the back 131 and is formed of, for example, a long rod-like member composed of a material more rigid than other areas (such as a cushion) of the backrest 20.

For example, the support member 50 is provided as a pair of support members that are symmetrical with respect to a center line in the left-right direction of the backrest 20.

In order to conform to the inclination of the ribs, the longitudinal direction of each support member 50 is disposed at an angle such that the outer side thereof in the left-right direction is lower than the center thereof.

Normally, each support member 50 is disposed to support the ninth rib of the occupant 100 from below.

In order to conform to different physiques of occupants 100, each support member 50 is attached in a relatively movable manner in the vertical direction relative to the backrest 20.

Figure 3:
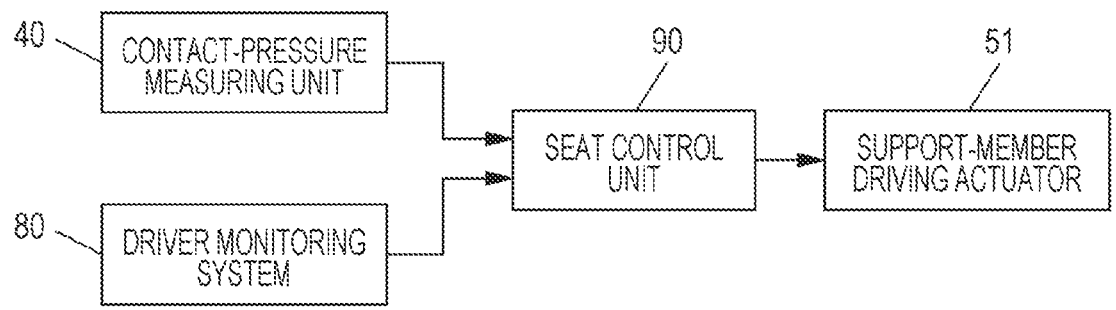
FIG. 3 is a block diagram schematically illustrating the configuration of a control system of the seat according to the embodiment.

Each support member 50 is equipped with a support-member driving actuator 51 (see FIG. 2 and FIG. 3).

The support-member driving actuator 51 drives the support member 50 in the vertical direction along the backrest 20 to move the support member 50.

The support-member driving actuator 51 may be, for example, an electric actuator having an electric motor and a reduction gear train, but is not limited thereto. The support-member driving actuator 51 may be an actuator of another kind.

This embodiment is provided with a function for estimating the height of the ninth rib by acquiring physique-related information of the occupant 100, and automatically adjusting the height of the support member 50 by using the support-member driving actuator 51.

This will be described in detail later.

An instrument panel 60 serving as a vehicle interior member disposed facing the seat 1 is provided with a camera 70.

The camera 70 has, for example, a solid-state imaging element, such as either of a complementary metal-oxide semiconductor (CMOS) device and a charge-coupled device (CCD), an output processing circuit, and an imaging optical system (i.e., a lens group).

The camera 70 captures an image of the occupant 100 sitting in the seat 1 and transmits acquired image data to a driver monitoring system 80 to be described below.

FIG. 3 is a block diagram schematically illustrating the configuration of a control system of the seat 1 according to the embodiment.

In addition to the contact-pressure measuring unit 40 described above, the control system of the seat 1 has, for example, the driver monitoring system 80, a seat control unit 90, and the support-member driving actuator 51.

The driver monitoring system 80 is an image processor that identifies the sitter (e.g., a driver) 100 sitting in the seat 1 by facial recognition and acquires physique-related information based on the image captured by the camera 70.

For example, the driver monitoring system 80 has a function for determining the height position of the first thoracic vertebra located above the shoulders (i.e., near the upper end of the upper body 130) of the occupant 100.

Based on information from the contact-pressure measuring unit 40 and the driver monitoring system 80, the seat control unit 90 controls the support-member driving actuator 51.

The seat control unit 90 can include a microcomputer having, for example, an information processor, such as a central processing unit (CPU), a storage unit, such as either of a random access memory (RAM) and a read-only memory (ROM), an input-output interface, and a bus that couples these components to one another.

In one embodiment, the seat control unit 90 may serve as a "specific-region position estimator", a "controller", and a "seated-state abnormality detector".

The function and the operation of the seat control unit 90 will be described in detail later.

Next, drive control of each support member 50 in the seat 1 according to the embodiment will be described.

Figure 4:
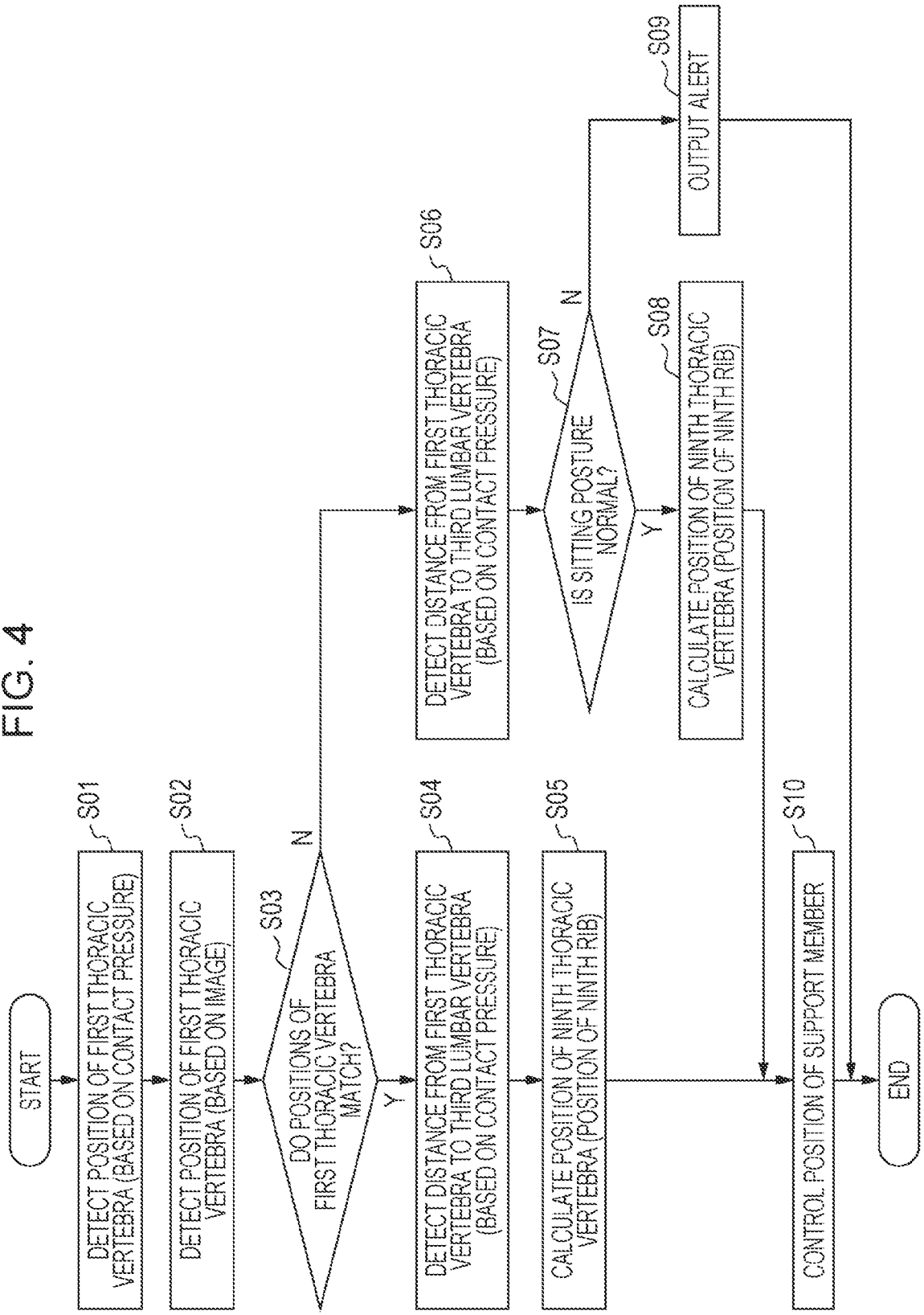
FIG. 4 is a flowchart illustrating drive control of a support member in the seat according to the embodiment.

FIG. 4 is a flowchart illustrating the drive control of each support member 50 in the seat 1 according to the embodiment.

The steps will be described below in a predetermined sequence.

In step S01, the seat control unit 90 detects the position (normally, the distance from the hip point of the seat surface 10) of the first thoracic vertebra of the occupant 100 in the height direction based on an output from the contact-pressure measuring unit 40.

FIG. 5 illustrates an example of a detection result of the contact-pressure measuring unit 40 in the seat 1 according to the embodiment.

In FIG. 5, the ordinate axis indicates the distance from the hip point, and the abscissa axis indicates the contact pressure (which is higher at the right side).

In the contact-pressure (body-pressure) distribution, it is conceivable that a peak appearing at the highest position indicates the position of the first thoracic vertebra.

For example, in the example illustrated in FIG. 5, it is conceivable that the first thoracic vertebra is located at the position of about 430 mm.

Subsequently, the process proceeds to step S02.

In step S02, the driver monitoring system 80 performs image processing on the image data acquired by the camera 70 so as to detect the height of the first thoracic vertebra of the occupant 100.

The detected height of the first thoracic vertebra is transmitted to the seat control unit 90.

Then, the process proceeds to step S03.

In step S03, the seat control unit 90 determines whether the position of the first thoracic vertebra detected from the contact pressure in step S01 and the position of the first thoracic vertebra detected from the image in step S02 substantially match.

For example, if an absolute value of a difference between the detection values is smaller than or equal to a predetermined threshold value, it is determined that the positions substantially match and the process proceeds to step S04. Otherwise, it is determined that the positions do not match and the process proceeds to step S06.

In step S04, the seat control unit 90 detects the distance from the first thoracic vertebra (i.e., a first reference point) to the third lumbar vertebra (i.e., a second reference point) of the occupant 100 based on an output from the contact-pressure measuring unit 40.

As illustrated in FIG. 5, in the contact-pressure (body-pressure) distribution, a decrease in the contact pressure is observed at the height of 215 mm to 220 mm from the hip point.

It is conceivable that the height where this decrease in the contact pressure has occurred indicates the height of the third lumbar vertebra.

Subsequently, the process proceeds to step S05.

In step S05, the seat control unit 90 uses Expression 1 indicated below to calculate the position of the ninth thoracic vertebra of the occupant 100.

It is conceivable that the position of the ninth thoracic vertebra substantially matches the position of the ninth rib serving as the specific region according to the embodiment.

(Height of First Thoracic Vertebra to Height of Ninth Thoracic Vertebra)=(Height of First Thoracic Vertebra to Height of Third Lumbar Thoracic Vertebra to Height of Third Lumbar Vertebra)×(Statistical Average Value of Height of First Thoracic Vertebra to Height of Ninth Thoracic Vertebra)    Expression 1

After the position of the ninth thoracic vertebra is calculated, the process proceeds to step S10.

In step S06, the seat control unit 90 detects the distance from the first thoracic vertebra to the third lumbar vertebra of the occupant 100 based on an output from the contact-pressure measuring unit 40.

Subsequently, the process proceeds to step S07.

In step S07, the seat control unit 90 uses Expression 2 indicated below to determine whether the shoulder blades (i.e., a region from the first thoracic vertebra to the seventh thoracic vertebra) of the occupant 100 are recognized based on an output from the contact-pressure measuring unit 40.

{(Height of First Thoracic Vertebra to Height of Seventh Thoracic Vertebra)/(Statistical Average Value of Height of First Thoracic Vertebra to Height of Seventh Thoracic Vertebra)}−{(Height of First Thoracic Vertebra to Height of Third Lumbar Thoracic Vertebra to Height of Third Lumbar Vertebra)}m    Expression 2

Each statistical average value can be stored in advance in the storage unit of the seat control unit 90.

Subsequently, if the size (i.e., the distance from the first thoracic vertebra to the seventh thoracic vertebra) of the shoulder blades is recognizable and, for example, if a difference between the size of the shoulder blades estimated from the physique of the occupant 100 recognized by the driver monitoring system 80 and the size of the shoulder blades calculated from Expression 2 is equal to a predetermined threshold value (e.g., within a range of +5%), the seat control unit 90 determines that a reasonable size of the shoulder blades is detected relative to the physique of the occupant 100 and that the occupant 100 is sitting in a normal posture, and the process proceeds to step S08. Otherwise, the seat control unit 90 determines that the occupant 100 is sitting in an abnormal posture, and the process proceeds to step S09.

In step S08, the seat control unit 90 uses Expression 1 indicated above to calculate the position of the ninth thoracic vertebra of the occupant 100.

After the position of the ninth thoracic vertebra is calculated, the process proceeds to step S10.

In step S09, based on the state where the occupant 100 is sitting in an abnormal posture and the support member 50 is not appropriately adjustable, the seat control unit 90 outputs an alert for prompting the occupant 100 to correct the sitting posture via, for example, a warning light, an image display device, and an audio output device.

If the seat 1 is a so-called power seat that can be adjusted using, for example, an electric actuator for front-rear sliding, tilting, and lifting the seat surface 10, as well as for tilting the backrest 20, the state of the seat 1 may be changed for correcting the posture of the occupant 100.

Subsequently, the process ends (i.e., returns to the beginning).

In step S10, based on the position of the ninth thoracic vertebra calculated in either of step S05 and step S08, the seat control unit 90 commands the support-member driving actuator 51 to adjust the position (i.e., the height) of the support member 50 so that the support member 50 becomes capable of supporting the ninth rib located at substantially the same height.

Subsequently, the process ends (i.e., returns to the beginning).

As described above, according to this embodiment, the following effects can be achieved.

1. The seat control unit 90 calculates (i.e., estimates) the position of the ninth rib serving as the specific region of the body of the occupant 100 for which the support is to be reinforced, and controls the support-member driving actuator 51 in accordance with the estimation result, so that the support member 50 can be automatically disposed at a position for supporting the ninth rib, thereby easily supporting the ninth rib without forcing the occupant 100 to perform a complicated operation and achieving a favorable body-supported state.

2. The position of the ninth rib is calculated based on the output from the contact-pressure measuring unit 40, so that the position of the ninth rib can be accurately estimated.

3. Based on the contact-pressure distribution, the position of the first thoracic vertebra serving as the first reference point set in the upper area of the upper body 130 of the occupant 100 and the position of the third lumbar vertebra serving as the second reference point set in the lumbar area of the occupant 100 are detected, and the position of the ninth rib is estimated by internally dividing the distance between the first thoracic vertebra and the third lumbar vertebra by a predetermined statistically-obtained ratio, so that the position of the ninth rib can be easily estimated with a minor computing load.

4. If the position of the first thoracic vertebra detected by the driver monitoring system 80 and the position of the first thoracic vertebra detected based on the contact-pressure distribution deviate from each other by a predetermined amount or more, it is detected that the occupant 100 is sitting in an abnormal posture. Thus, when there is an irregular variation in the sitting posture of the occupant 100, inappropriate setting of the position of the support member 50 can be prevented.

5. The support member 50 supports the ninth rib, so that roll behavior in the body of the occupant 100, particularly, the upper body 130 and the head 140, is suppressed, thereby facilitating various operations, such as a driving operation, as well as enhancing riding comfort.

Modifications

The embodiment of the disclosure is not limited to that described above and permits various modifications and alterations that are within the technical scope of the embodiment of the disclosure.

1. The configurations of, for example, the seat, the control system, and the vehicle are not limited to those in the above embodiment and may be modified, where appropriate.

For example, the elements and components constituting the seat, the control system, and the vehicle may be modified, where appropriate.

2. In the embodiment, the ninth rib is supported by the support member. Alternatively, the embodiment of the disclosure may be applied to a case where the support for another specific region (e.g., another rib or another lumbar vertebra) of the body of the sitter is to be reinforced.

3. In the embodiment, a front seat of a car is described as an example. Alternatively, the embodiment of the disclosure may be applied to, for example, any of a seat in the second row or onward of a car, a seat in a vehicle of another kind or shape, and a seat in a railway vehicle.

Furthermore, as an alternative to a vehicular seat, the embodiment of the disclosure may be applied to various kinds of seats, such as a seat in either of an aircraft and a marine vessel and a seat in any of a home, an office, a theater, and a restaurant.

According to the embodiment of the disclosure, the position of the specific region of the body of the sitter for which the support is to be reinforced is estimated by the specific-region position estimator, and a support-member driving unit is controlled in accordance with the estimation result, so that the support member can be automatically disposed at a position for supporting the specific region, thereby easily supporting the specific region without forcing the sitter to perform a complicated operation and achieving a favorable body-supported state.

According to the embodiment of the disclosure, the physique of the sitter can be accurately recognized in accordance with the contact-pressure (body-pressure) distribution, and the position of the specific region can be accurately estimated in accordance with the recognized physique.

In the embodiment of the disclosure, the specific-region position estimator may be configured to detect the position of the first reference point set in the upper area of the upper body of the sitter and the position of the second reference point set in the lumbar area of the sitter based on the contact-pressure distribution, and estimate the position of the specific region by internally dividing the distance between the first reference point and the second reference point by the predetermined ratio.

Accordingly, based on the position of the first reference point and the position of the second reference point, the position of the specific region can be easily estimated with a minor computing load.

For example, the predetermined ratio used may be a known statistically-obtained value.

The embodiment of the disclosure may be provided with an image processor that detects the position of the first reference point based on an image captured by an imaging unit that captures the image of the sitter and a seated-state abnormality detector that detects an abnormality in the seated state of the sitter in a case where the position of the first reference point detected by the image processor and the position of the first reference point detected based on the aforementioned contact-pressure distribution deviate from each other by a predetermined amount or more.

Accordingly, when there is an irregular variation in the sitting posture of the sitter, inappropriate setting of the position of the support member can be prevented.

In the embodiment of the disclosure, the specific region may be the ninth rib of the sitter.

Accordingly, roll behavior in the body of the sitter is suppressed, thereby facilitating various operations, such as a driving operation, as well as enhancing riding comfort.

As described above, the embodiment of the disclosure can provide a seat that can easily achieve a favorable body-supported state in accordance with different physiques of sitters.

The control system illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control system including the contact-pressure measuring unit 40, the driver monitoring system 80, the seat control unit 90, and the support-member driving actuator 51. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:

1. A seat comprising a seat surface and a backrest, the seat comprising:
   a support member provided in the backrest, the support member being configured to support a predetermined region of a body of a sitter to be seated on the seat and being movable in a vertical direction;

a motor configured to drive the support member in the vertical direction relative to the backrest;

a contact-pressure distribution detector provided in the backrest and configured to detect a distribution of contact pressure received from a back of the sitter; and a processor configured to:
  detect a position of a first reference point and a position of a second reference point based on the distribution of the contact pressure, the first reference point being set in an upper area of an upper body of the sitter, the second reference point being set in a lumbar area of the sitter;
  estimate, based on the position of the first reference point and the position of the second reference point, a position of a specific region of the sitter that is defined in advance; and
  control the motor such that the support member supports the specific region in accordance with the estimated position of the specific region.

2. The seat according to claim 1, wherein the processor is configured to estimate the position of the specific region by internally dividing a distance between the first reference point and the second reference point by a predetermined ratio.

3. The seat according to claim 2, wherein the specific region comprises a ninth rib location of the sitter.

4. The seat according to claim 1, further comprising
an image processor configured to detect the position of the first reference point based on an image of the sitter captured by a camera configured to capture the image,
wherein the processor is configured to detect an abnormality in a seated state of the sitter in a case where the position of the first reference point detected by the image processor and the position of the first reference point detected based on the distribution of the contact pressure deviate from each other by a predetermined amount or more.

5. The seat according to claim 4, wherein the specific region comprises a ninth rib location of the sitter.

6. The seat according to claim 1, wherein the specific region comprises a ninth rib location of the sitter.

7. A seat comprising a seat surface and a backrest, the seat comprising:
  a support member provided in the backrest, the support member being configured to support a predetermined region of a body of a sitter to be seated on the seat and being movable in a vertical direction;
  a motor configured to drive the support member in the vertical direction relative to the backrest;
  a contact-pressure distribution detector provided in the backrest and configured to detect a distribution of contact pressure received from a back of the sitter; and
  circuitry configured to:
    detect a position of a first reference point and a position of a second reference point based on the distribution of the contact pressure, the first reference point being set in an upper area of an upper body of the sitter, the second reference point being set in a lumbar area of the sitter;
    estimate, based on the position of the first reference point and the position of the second reference point, a position of a specific region of the sitter that is defined in advance, and
    control the motor such that the support member supports the specific region in accordance with the estimated position of the specific region.

8. The seat according to claim 7, wherein the circuitry is configured to estimate the position of the specific region by internally dividing a distance between the first reference point and the second reference point by a predetermined ratio.

9. The seat according to claim 8, further comprising an image processor configured to detect the position of the first reference point based on an image of the sitter captured by a camera configured to capture the image,
wherein the circuitry is configured to detect an abnormality in a seated state of the sitter in a case where the position of the first reference point detected by the image processor and the position of the first reference point detected based on the distribution of the contact pressure deviate from each other by a predetermined amount or more.

10. The seat according to claim 9, wherein the specific region comprises a ninth rib location of the sitter.

11. The seat according to claim 8, wherein the specific region comprises a ninth rib location of the sitter.

12. The seat according to claim 7, further comprising an image processor configured to detect the position of the first reference point based on an image of the sitter captured by a camera configured to capture the image,
wherein the circuitry is configured to detect an abnormality in a seated state of the sitter in a case where the position of the first reference point detected by the image processor and the position of the first reference point detected based on the distribution of the contact pressure deviate from each other by a predetermined amount or more.

13. The seat according to claim 12, wherein the specific region comprises a ninth rib location of the sitter.

14. The seat according to claim 7, wherein the specific region comprises a ninth rib location of the sitter.

* * * * *